(12) United States Patent
Liang

(10) Patent No.: US 12,145,028 B2
(45) Date of Patent: Nov. 19, 2024

(54) BALL STRUCTURE WITH LIGHTING MODULE

(71) Applicant: YUHONG ELECTRONIC (SHENZHEN) CO., LTD., Guangdong (CN)

(72) Inventor: Wei-Jen Liang, New Taipei (TW)

(73) Assignee: YUHONG ELECTRONIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/218,998

(22) Filed: Jul. 6, 2023

(65) Prior Publication Data
US 2024/0335705 A1    Oct. 10, 2024

(30) Foreign Application Priority Data

Apr. 7, 2023  (CN) .......................... 202320863277.1

(51) Int. Cl.
*A63B 43/06*  (2006.01)
*H02J 7/00*  (2006.01)

(52) U.S. Cl.
CPC ............ *A63B 43/06* (2013.01); *H02J 7/0042* (2013.01); *A63B 2225/74* (2020.08)

(58) Field of Classification Search
CPC ..... A63B 43/06; A63B 2225/74; A63B 43/04; H02J 7/0042
See application file for complete search history.

(56) References Cited

U.S. PATENT DOCUMENTS

| | | | | |
|---|---|---|---|---|
| 4,577,865 A | * | 3/1986 | Shishido | A63B 43/00 473/570 |
| 4,595,200 A | * | 6/1986 | Shishido | A63B 43/00 473/570 |
| 5,236,383 A | * | 8/1993 | Connelly | A63B 43/06 473/576 |
| 5,609,411 A | * | 3/1997 | Wang | A63B 43/06 362/253 |
| 5,669,702 A | * | 9/1997 | Wang | F21V 3/023 446/485 |
| 5,775,800 A | * | 7/1998 | Hsieh | F21V 33/008 362/800 |
| 9,384,676 B2 | * | 7/2016 | Costain | A63B 41/00 |

(Continued)

FOREIGN PATENT DOCUMENTS

CN   105597284 A  *  5/2016
GB   2308309 A  *  6/1997  ............ A63B 43/06

*Primary Examiner* — Steven B Wong
(74) *Attorney, Agent, or Firm* — Chun-Ming Shih; HDLS IPR SERVICES

(57) ABSTRACT

A ball structure includes a light-permeable ball, a lighting module and a waterproof cap. The light-permeable ball is disposed with an opening. The lighting module includes a light-permeable sleeve disposed in the light-permeable ball, and a circuit board set. An end of the light-permeable sleeve has an open end corresponding to the opening. The circuit board set includes a circuit board received in the light-permeable sleeve, and a lighting element, a vibration switch, an electricity storage element and a charge connector all electrically installed on the circuit board. The charge connector is exposed from the opening. The waterproof cap plugs and seals the opening and the open end. Therefore, the ball structure has functions of lighting and charging.

8 Claims, 7 Drawing Sheets

(56) References Cited

U.S. PATENT DOCUMENTS

| | | | | |
|---|---|---|---|---|
| 10,076,685 B2* | 9/2018 | King | ......................... | H02J 50/90 |
| 10,799,769 B2* | 10/2020 | Wolfinbarger | .......... | A63B 45/00 |
| 11,266,883 B2* | 3/2022 | Ianni | .................... | A63B 43/004 |
| 11,511,164 B2* | 11/2022 | Francis | ................... | A63B 41/08 |
| 11,559,725 B1* | 1/2023 | Ayal | ........................ | A63B 43/06 |
| 2003/0224885 A1* | 12/2003 | Leal | ........................ | A63B 43/06 |
| | | | | 473/570 |
| 2007/0021244 A1* | 1/2007 | Ko | .......................... | A63B 41/00 |
| | | | | 473/570 |
| 2007/0281811 A1* | 12/2007 | Wang | ...................... | A63B 43/06 |
| | | | | 473/570 |
| 2011/0136604 A1* | 6/2011 | Hsu | ......................... | A63B 41/00 |
| | | | | 473/609 |
| 2012/0058845 A1* | 3/2012 | Crowley | ................. | A63B 41/00 |
| | | | | 206/522 |
| 2012/0244969 A1* | 9/2012 | Binder | ...................... | G01P 1/07 |
| | | | | 473/570 |
| 2015/0157900 A1* | 6/2015 | Holthouse | ............... | A63B 41/04 |
| | | | | 473/570 |
| 2016/0243410 A1* | 8/2016 | Larson | .................. | A63B 41/085 |
| 2016/0354646 A1* | 12/2016 | Wang | ...................... | A63B 43/06 |
| 2018/0043218 A1* | 2/2018 | Hu | .......................... | A63B 41/00 |
| 2022/0401797 A1* | 12/2022 | Husemeyer | ......... | A63B 24/0021 |

\* cited by examiner

BALL STRUCTURE WITH LIGHTING MODULE

BACKGROUND

Technical Field

The disclosure relates to a ball structure such as a basketball, a soccer ball, a volley ball or a rugby ball, particularly to a ball structure with a lighting module.

Related Art

With the advocacy of focusing on exercise and fitness, as far as various exercises are concerned, ball games, such as basketball, football, volleyball, baseball, golf, table tennis, tennis, rugby, etc., have become common and popular among the public.

However, most related-art basketballs, soccer balls, volleyballs and rugby balls do not have light-emitting functions, so throwing and catching exercises in an environment with insufficient light are prone to accidents being hit by a ball, which in turn increases the danger of ball games.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides a ball structure with a lighting module, which uses a lighting module and a charge connector installed in a light-permeable ball to accomplish the functions of lighting and charging of the ball structure.

In an embodiment of the disclosure, the disclosure provides a ball structure with a lighting module, which includes: a light-permeable ball, disposed with an opening: a lighting module, including: a light-permeable sleeve, disposed in the light-permeable ball, and an end of the light-permeable sleeve having an open end corresponding to the opening; and a circuit board set, including a circuit board received in the light-permeable sleeve, and a lighting element, a vibration switch, an electricity storage element and a charge connector all electrically installed on the circuit board, and the charge connector exposed from the opening; and a waterproof cap, plugging and sealing the opening and the open end.

According the above, the lighting module is installed in the light-permeable ball for lighting when the light-permeable ball is being played. Thus, the position of the ball structure may be clearly seen during throwing or catching a ball in a low-light environment to avoid accidents of being beaten by a ball and improve convenience and safety of using the ball structure.

According the above, when the electricity storage element is out of power and the ball structure is unable to light up, a user may open the sealing cap to expose the charge connector for charging to further improve using convenience of the ball structure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIGS. 1-7. The disclosure provides a ball structure with a lighting module. The ball structure 10 includes a light-permeable ball 1, a lighting module 2 and a waterproof cap 3.

Figure 5:
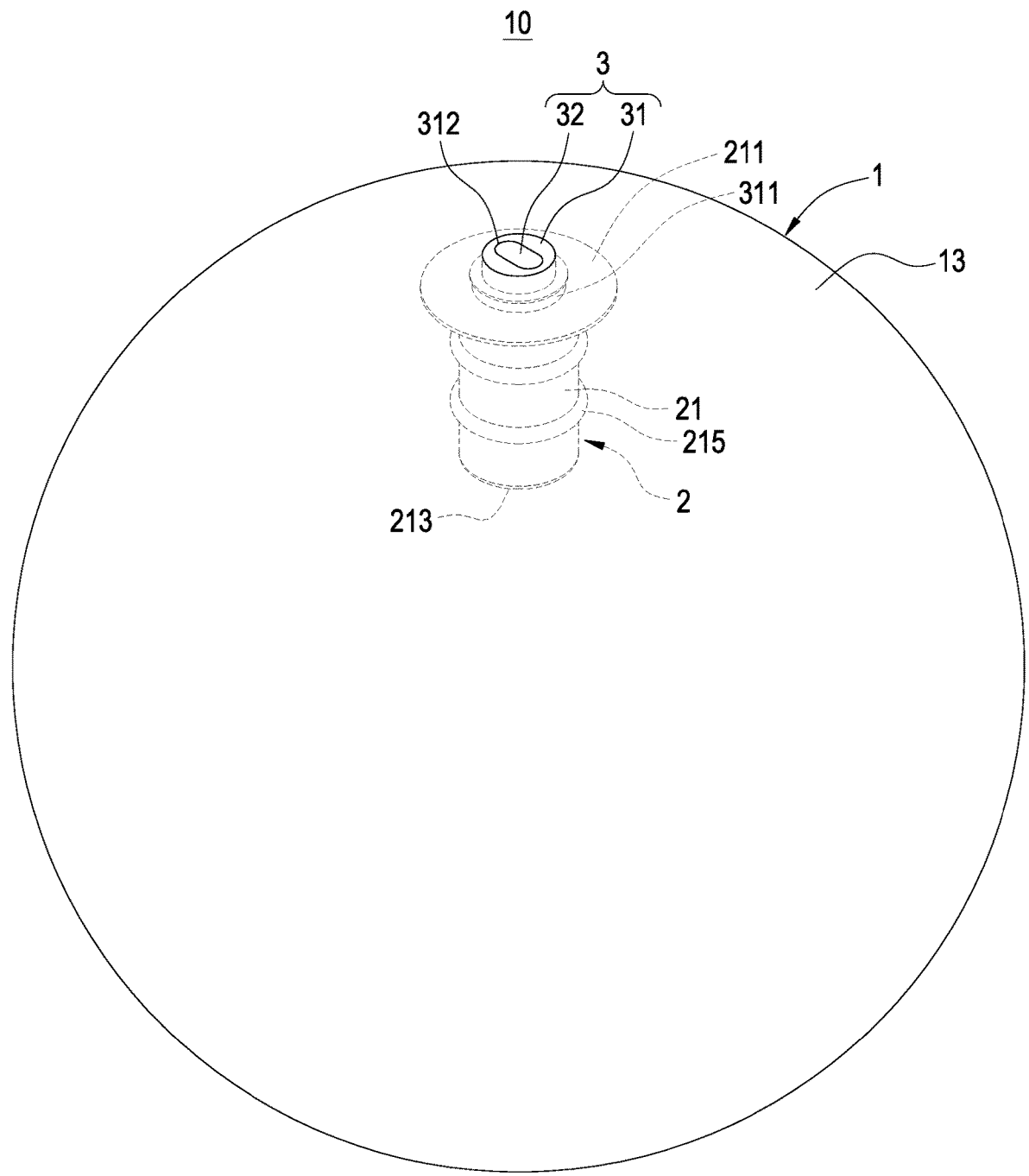
FIG. 5 is a perspective assembled view of the ball structure of the disclosure.
Figure 6:
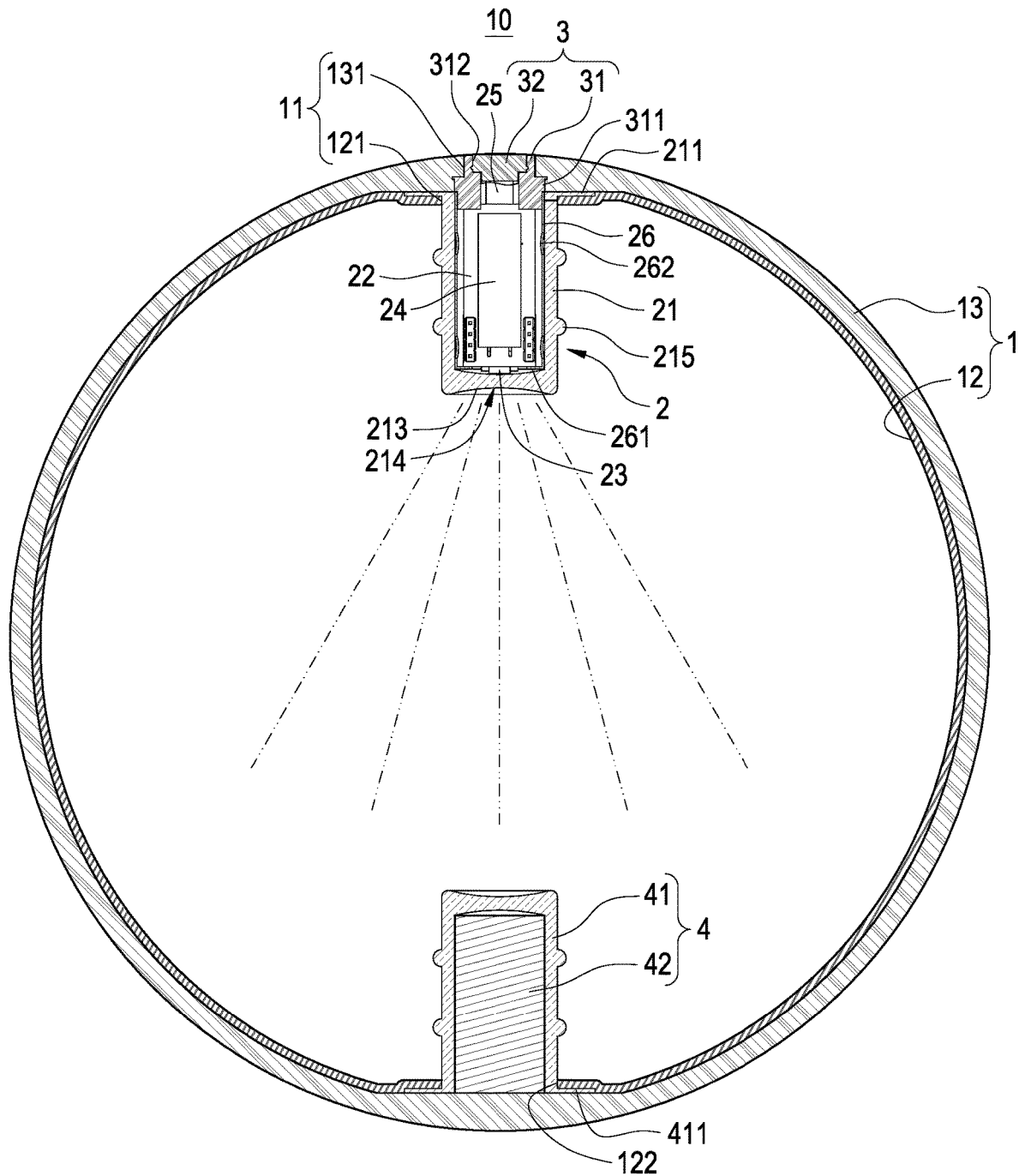
FIG. 6 is an assembled cross-sectional view of the ball structure of the disclosure.
Figure 7:
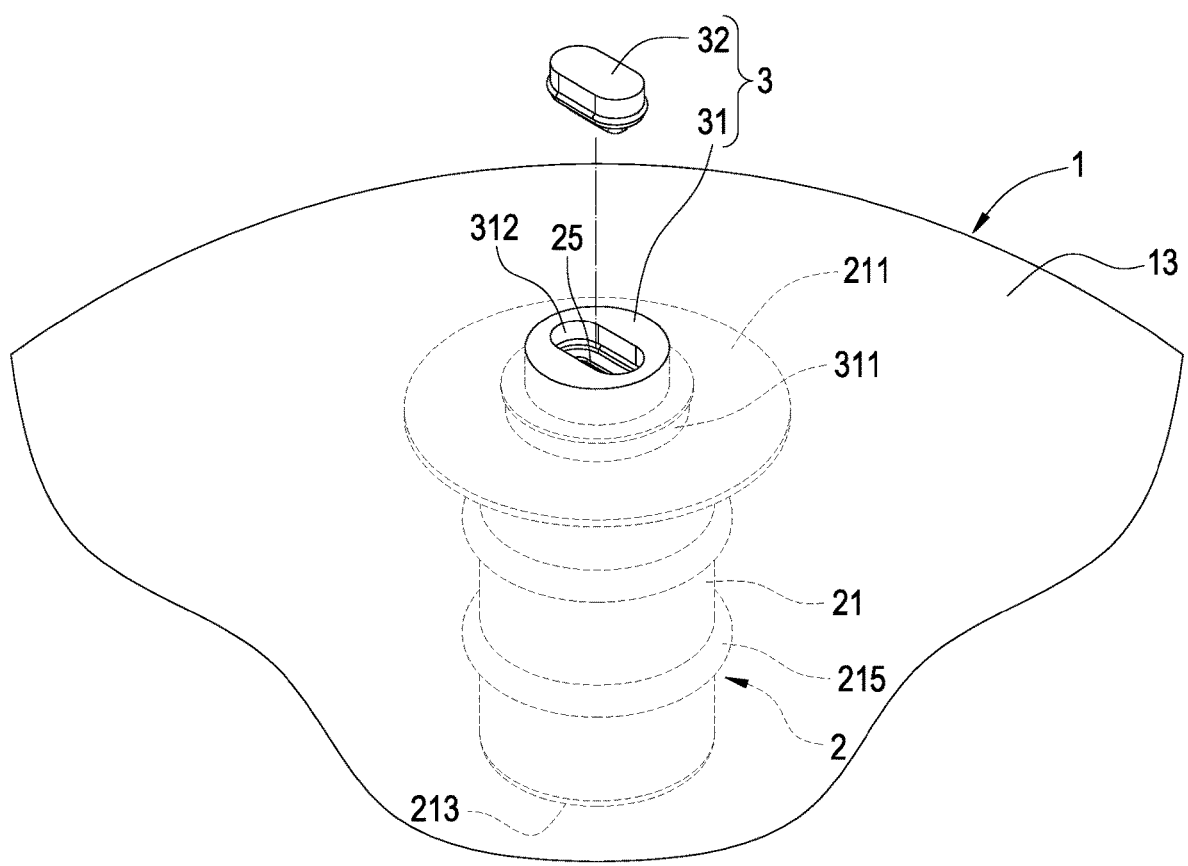
FIG. 7 is a schematic view of a using status of the ball structure of the disclosure.

As shown in FIGS. 5-7, the light-permeable ball 1 is disposed with an opening 11. In detail, the light-permeable ball 1 includes an inner layer 12 and an outer layer 13 attached to each other. The inner layer 12 and the outer layer 13 are made of light-permeable polyvinyl chloride (PVC) soft plastic or silicone. The opening 11 includes a first opening 121 formed on the inner layer 12 and a second opening 131 formed on the outer layer 13 corresponding to the first opening 121.

As shown in FIGS. 1-7, the lighting module 2 includes a light-permeable sleeve 21, a circuit board 22, a lighting element 23, a vibration switch 27, an electricity storage element 24, a charge connector 25, a protective tube 26 and a plastic body 28.

The light-permeable sleeve 21 may be made of light-permeable polyvinyl chloride (PVC) soft plastic or silicone. An end of the light-permeable sleeve 21 has an open end 212 corresponding to the opening 11 and has a closed end 213 on the other end. That is, an end of the light-permeable sleeve 21 has a through opening to be the open end 212 and the other end is sealed to be the closed end 213. The light-permeable sleeve 21 is disposed with an outer annular sheet 211 extended from a periphery of the open end 212.

Further, the light-permeable sleeve 21 passes through the first opening 121 first, the outer annular sheet 211 is adhered on the outside of the inner layer 12, then the inner layer 12 and the light-permeable sleeve 21 are commonly placed inside the outer layer 13, and finally the inside of the inner layer 12 is filled with air to make the inner layer 12 inflated to be tightly connected with the outer layer 13 to finish placing the light-permeable sleeve 21 in the light-permeable ball 1.

In addition, the closed end 213 of the embodiment has a concave lens 214 with two concave surfaces opposite to each other. The concave lens 214 has a function of light diffusion, but not limited to this. The closed end 213 may also have a convex lens with two convex surfaces opposite to each other. The convex lens has a function of light concentration. The periphery of the light-permeable sleeve 21 is extended with multiple annular ribs 215 which are arranged in a row at intervals to improve the structural strength of the light-permeable sleeve 21.

Furthermore, the circuit board 22 is received in the light-permeable sleeve 21. The lighting element 23 is a light emitting diode. The lighting element 23 is electrically installed on the circuit board 22 corresponding to the concave lens 215 or the convex lens.

Also, the vibration switch 27 and the electricity storage element 24 are separately installed on the circuit board 22. The electricity storage element 24 is a rechargeable battery or a capacitor. The electricity storage element 24 is used for supplying electricity to the lighting element 23 and the vibration switch 27. The vibration switch 27 automatically opens or closes the circuit of the circuit board 22 and the lighting element 23 depending upon vibration. For example, when the light-permeable ball 1 is oscillated by an external force, a resonance effect occurs inside, this effect makes the vibration switch 27 open the circuit of the circuit board 22 and the lighting element 23 to have the lighting element 23 light up.

Moreover, the charge connector 25 is electrically installed on the circuit board 22 and is exposed from the opening 11. The charge connector 25 is used for helping the electricity storage element 24 to be charged.

In addition, the protective tube 26 is made of hard plastic or metal. The protective tube 26 inserted inside the light-permeable sleeve 21 and abuts against the inner surface of the light-permeable sleeve 21. An end of the protective tube 26, which is adjacent to the closed end 213, is extended with an inner annular sheet 261 surrounding the outside of the lighting element 23 and is disposed with multiple through holes 262. The lighting element 23 projects from the inner annular sheet 261 to guide light to the light-permeable sleeve 21.

As shown in FIGS. 1, 2 and 4-7, the waterproof cap 3 plugs and seals the opening 11 and the open end 212. The waterproof cap 3 includes a sealing base 31 and a sealing cap 32. The sealing base 31 and the sealing cap 32 are separately made of silicone or rubber. The sealing base 31 plugs the insides of the protective sleeve 26, the opening 11 and the outside of the charge connector 25. The periphery of the sealing base 31 is extended with a sealing ring 311 and disposed with a notch 312. The sealing ring 311 abuts against and seals the gap between the light-permeable sleeve 21 and the protective tube 26. The notch 312 exposes the charge connector 25. The sealing cap 32 plugs and seals the notch 312.

In detail, the notch 312 is a T-shaped notch. The sealing cap 32 matches the T-shaped notch to be a T-shaped protrusion. The charge connector 25 is exposed from an inner bottom wall of the T-shaped notch. The notch 312 and the sealing cap 32 uses the T-shaped engagement to improve sealing and waterproofing.

Figure 1:
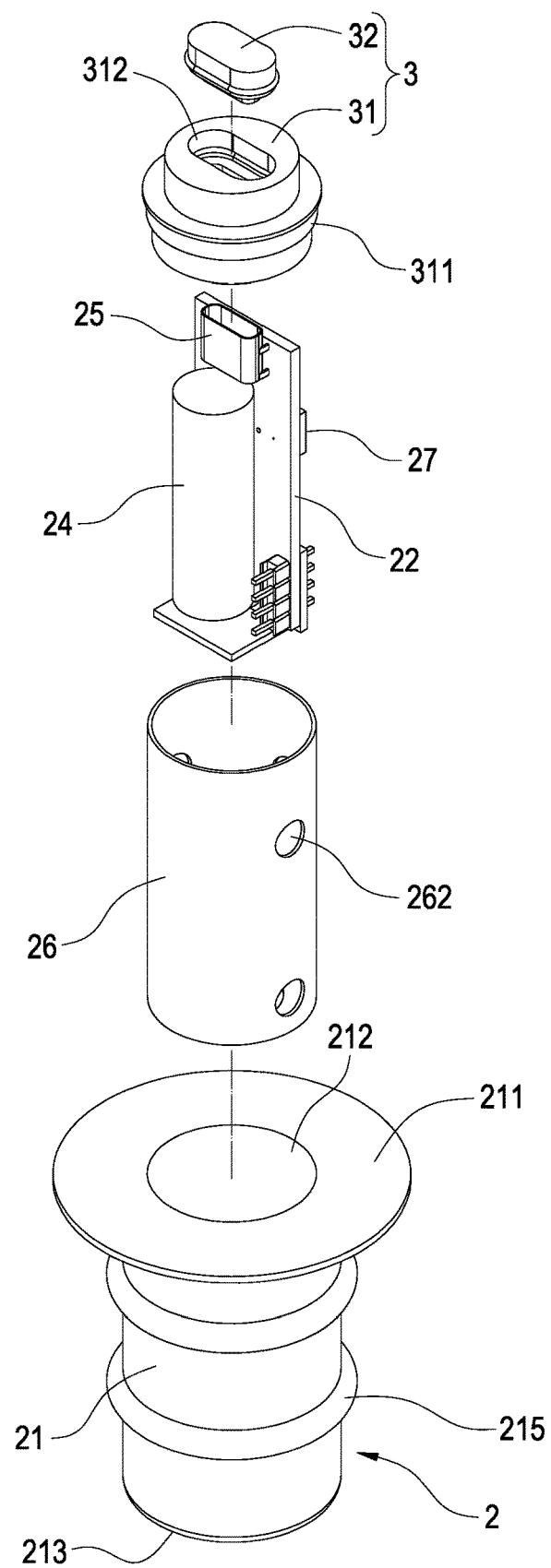
FIG. 1 is an exploded view of the lighting module of the disclosure.
Figure 2:
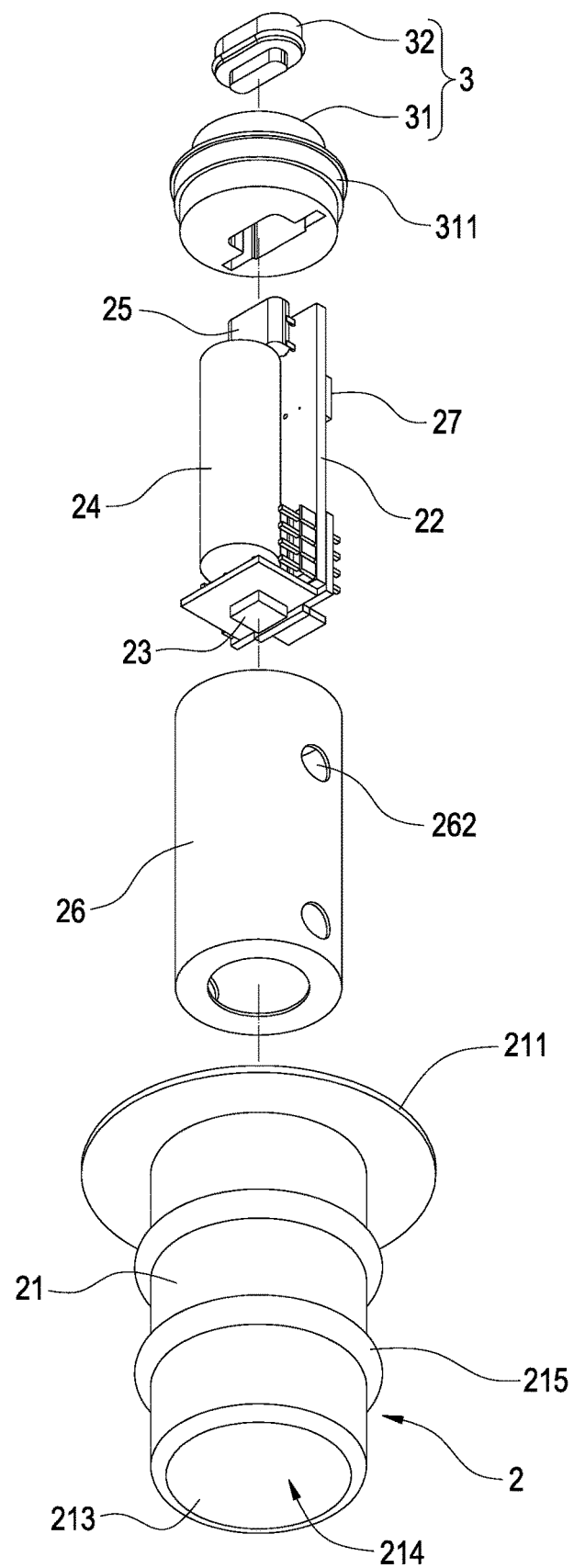
FIG. 2 is another exploded view of the lighting module of the disclosure.
Figure 3:
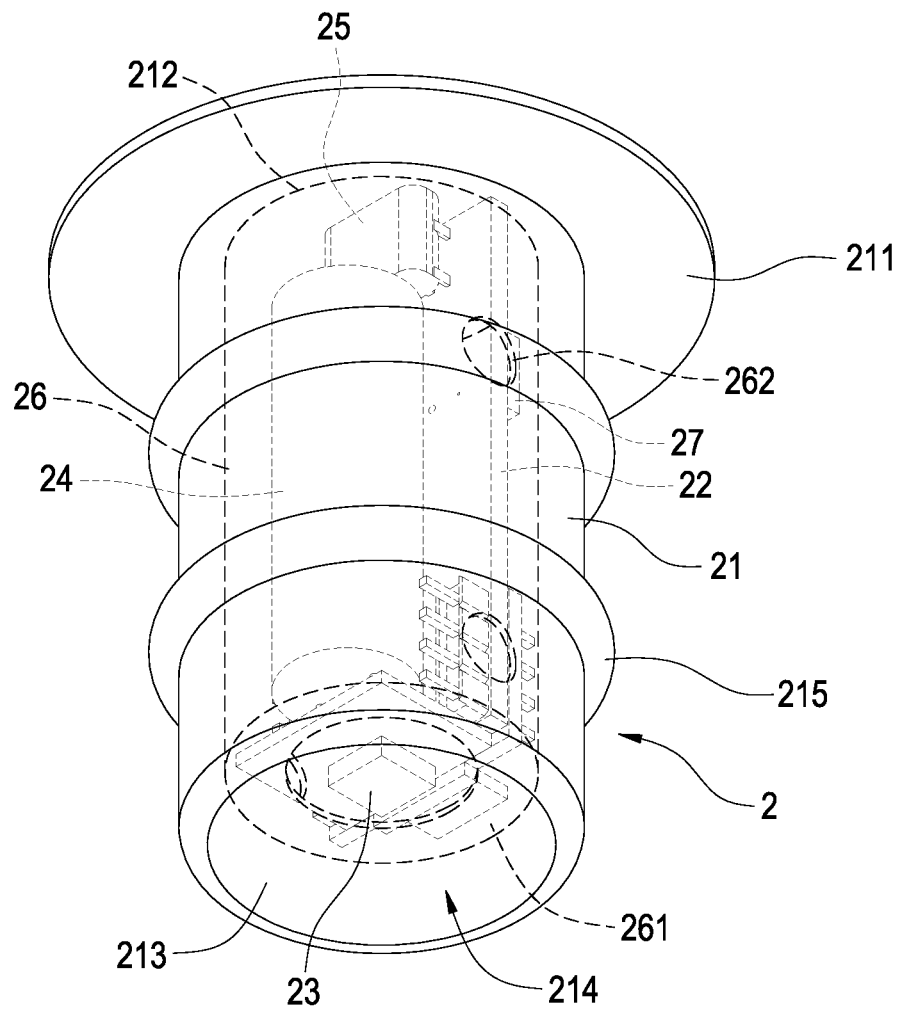
FIG. 3 is an assembled view of the lighting module of the disclosure.
Figure 4:
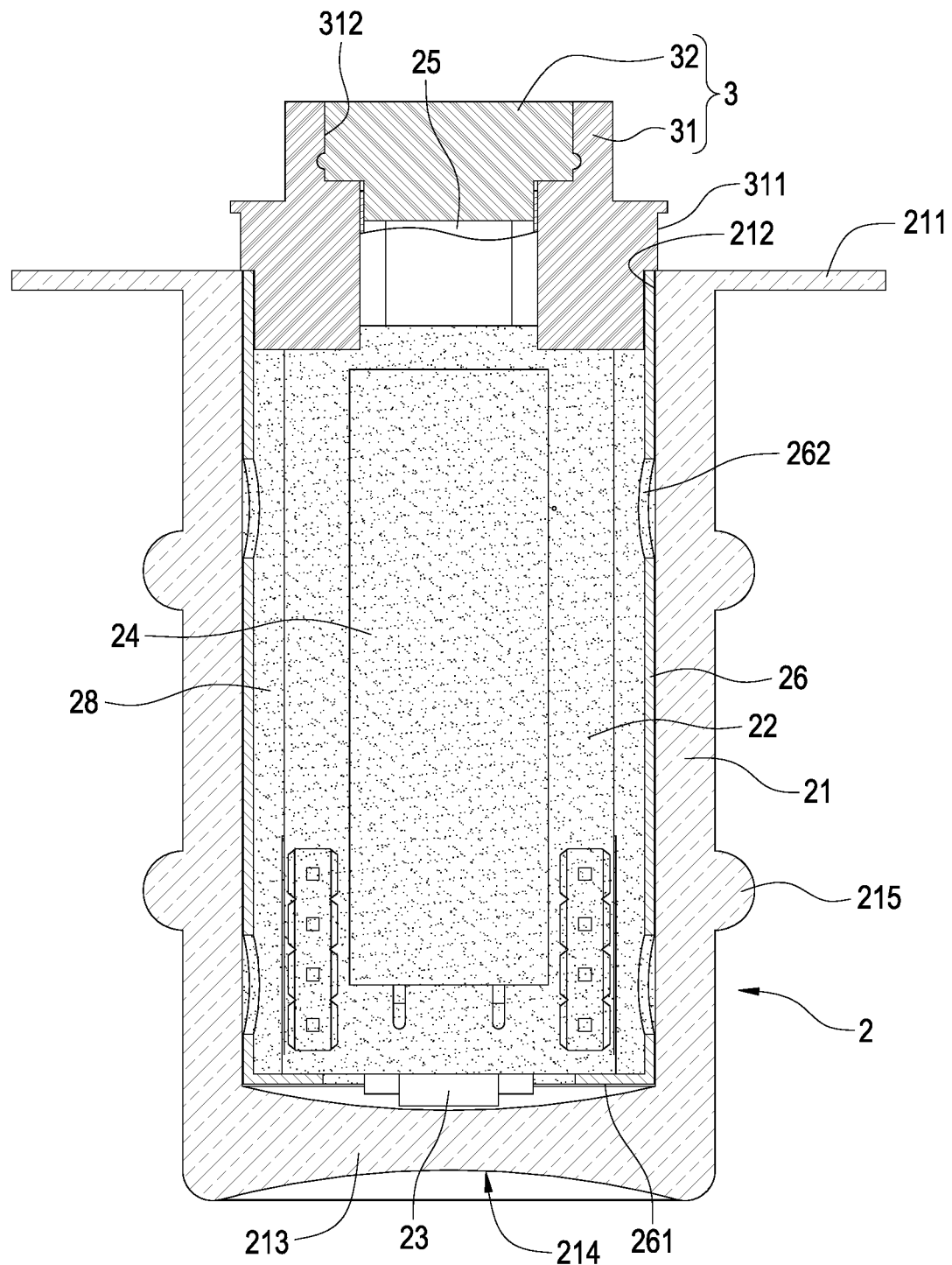
FIG. 4 is an assembled cross-sectional view of the lighting module of the disclosure.

As shown in FIG. 4, the plastic body 28 is filled in the protective tube 26 through the multiple through holes 262 and covers the circuit board 22, the lighting element 23, the electricity storage element 24, the charge connector 25 and the sealing base 31 to further position and protect the circuit board 22, the lighting element 23, the electricity storage element 24, and the charge connector 25, and to fill the gap between the sealing base 31, the light-permeable sleeve 21 and the protective tube 26 to improve the waterproof effect of the sealing base 31 at the opening 11.

As shown in FIG. 6, the ball structure 10 of the disclosure further includes a counterweight assembly 4. The inner layer 12 is disposed with a third opening 122 at an opposite end of the light-permeable ball 1 from the second opening 131. The counterweight assembly 4 includes a fixing sleeve 41 and an arranging block 42 received in the fixing sleeve 41.

A periphery of the fixing sleeve 41 is extended with an annular sheet 411. The fixing sleeve 41 passes through the third opening 122. The annular sheet 411 is adhered on the outside of the inner layer 12. In detail, the lighting module 2 and the counterweight assembly 4 are arranged at two ends of the light-permeable ball 1 opposite to each other to balance the counterweight of the ball structure 10 to make the center of gravity adjacent to the center of the light-permeable ball 1 to prevent the lighting module 2 from affecting the use of the ball structure 10.

As shown in FIGS. 1-7, the using status of the ball structure 10 of the disclosure uses the lighting module 2 in the light-permeable ball 1 to make the light-permeable ball 1 light up when being patted. Thus, when throwing or catching a ball in a low-light environment, the position of the ball structure 10 may be clearly seen to avoid accidents of being beaten by a ball to improve convenience and safety of using the ball structure 10.

In addition, as shown in FIG. 7, when the electricity storage element 24 is out of power and the ball structure 10 is unable to light up, a user may open the sealing cap 32 to expose the charge connector 25 for charging, and the electricity storage element 24 is a capacitor, so the ball structure 10 may be carried into an airplane to further improve using convenience of the ball structure 10.

While this disclosure has been described by means of specific embodiments, numerous modifications and variations could be made thereto by those skilled in the art without departing from the scope and spirit of this disclosure set forth in the claims.

What is claimed is:

1. A ball structure, comprising:
   a light-permeable ball, comprising an opening;
   a lighting module, comprising:
   a light-permeable sleeve, disposed in the light-permeable ball, and comprising an open end arranged corresponding to the opening; and
   a circuit board set, comprising a circuit board received in the light-permeable sleeve and comprising a lighting element, a vibration switch, an electricity storage element and a charge connector all electrically installed on the circuit board, and the charge connector exposed from the opening; and
   a waterproof cap, plugging and sealing the opening and the open end;
   wherein the light-permeable sleeve comprises a closed end opposite to the open end, the closed end comprises a concave lens or a convex lens, and the lighting element is arranged corresponding to the concave lens or the convex lens;
   wherein the lighting module further comprises a protective tube inserted inside the light-permeable sleeve and abutting against an inner surface of the light-permeable sleeve;
   wherein the waterproof cap comprises a sealing base and a sealing cap, the sealing base plugs the opening, inside of the protective tube and outside of the charge connector, the sealing base comprises a sealing ring extended from a periphery thereof and a notch exposing the charge connector, the sealing ring abuts against and seals a gap between the light-permeable sleeve and the protective tube, and the sealing cap plugs and seals the notch.

2. The ball structure of claim 1, wherein the light-permeable sleeve comprises multiple annular ribs extended from a periphery thereof and arranged spacedly.

3. The ball structure of claim 1, wherein the protective tube comprises an inner annular sheet extended from an end thereof adjacent to the closed end and surrounding an outside of the lighting element, and the lighting element is disposed protrusively from the inner annular sheet.

4. The ball structure of claim 1, wherein the notch is an T-shaped notch, the sealing cap is T-shaped protrusion corresponding to the T-shaped notch, and the charge connector is exposed from an inner bottom wall of the T-shaped notch.

5. The ball structure of claim 4, wherein the protective tube comprises multiple through holes, the lighting module further comprises a plastic body, and the plastic body is filled in the protective tube through the multiple through holes and covers the circuit board, the lighting element, the electricity storage element, the charge connector and the sealing base.

6. The ball structure of claim 1, wherein the light-permeable ball comprises an inner layer and an outer layer attached to each other, the opening comprises a first opening defined on the inner layer and a second opening defined on the outer layer corresponding to the first opening, the light-permeable sleeve comprises an outer annular sheet extended from a periphery of the open end, the light-permeable sleeve passes through the first opening, and the outer annular sheet is adhered on an outside of the inner layer.

7. The ball structure of claim 6, further comprising a counterweight assembly, wherein the inner layer comprises a third opening defined on one end thereof opposite to the second opening, the counterweight assembly comprises a fixing sleeve and an arranging block received in the fixing sleeve, the fixing sleeve comprises an annular sheet extended from a periphery thereof, the fixing sleeve passes through the third opening, and the annular sheet is adhered on the outside of the inner layer.

8. The ball structure of claim 1, wherein the lighting element is a light emitting diode, and the electricity storage element is a rechargeable battery or a capacitor.

\* \* \* \* \*